ent Office 3,655,884
Patented Apr. 11, 1972

3,655,884
ANTIINFLAMATORY GLUCOSE DERIVATIVES
Alberto Rossi, Oberwil, Basel-Land, and Armin Walter, Riehen, Switzerland, Werner Kessler, Loerrach, Baden, Germany, and Beat Iselin, Riehen, Switzerland, assignors to Ciba Corporation, Summit, N.J.
No Drawing. Filed Sept. 4, 1968, Ser. No. 757,459
Claims priority, application Switzerland, Sept. 11, 1967, 12,702/67; Sept. 25, 1967, 13,374/67; Sept. 26, 1967, 13,419/67; Nov. 28, 1967, 16,760/67; Apr. 25, 1968, 6,161/68
Int. Cl. A61k 27/00
U.S. Cl. 424—180
5 Claims

ABSTRACT OF THE DISCLOSURE

Glucofuranose compounds of the formula

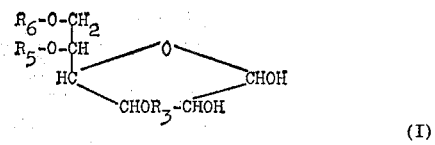

(I)

in which one of $R_3'$, $R_6'$ represents hydrogen, are, in the stituted hydrocarbon residue, with the proviso that $R_3$, $R_5$ and $R_6$ have together at least 4 carbon atoms, as well as acyl derivatives thereof, and salts of compounds having salt-forming groups, said compounds being in pure form, have anti-inflammatory properties. They, as well as those, in which one of $R_3$, $R_6'$ represents hydrogen, are, in the form of pharmaceutical preparations, useful as antiinflammatory agents.

SUMMARY OF THE INVENTION

The present invention concerns glucofuranose compounds of the above Formula I, in which $R_3$, $R_5$ and $R_6$ have the indicated meaning, as well as acyl derivatives thereof, and salts of compounds having salt-forming groups, said compounds being in pure form, as well as pharmaceutical preparations comprising compounds of the above Formula I, in which one of the groups $R_3$, $R_5$ and $R_6$ is hydrogen or an optionally substituted hydrocarbon residue and each of the others is an optionally substituted hydrocarbon residue. The above compounds, primarily in the form of the pharmaceutical preparations, are useful as antiinflammatory, particularly as antiexsudative or antiedematous agents.

DESCRIPTION OF THE PREFERRED EMBODIMENTS

The above compounds have the configuration of D-glucofuranose; the hydroxyl group in 1-position may have the α- or β-configuration, and the compounds of this invention may be in form of anomers or of mixtures of anomers.

The residues, radicals or compounds modified hereinafter by the term "lower" contain, unless otherwise indicated, in the first place up to 7, preferably up to 4 carbon atoms.

Optionally substituted hydrocarbon residues are in the first place organic residues of alcohols, especially optionally substituted aliphatic, cycloaliphatic, cycloaliphatic-aliphatic or in the first place araliphatic hydrocarbon residues; they may also represent optionally substituted aromatic hydrocarbon residues.

Aliphatic hydrocarbon residues are, for example, lower aliphatic hydrocarbon residues, in the first place lower alkyl or lower alkenyl, as well as lower alkinyl residues.

Substituents of such residues, particularly of lower alkyl radicals, are especially free or substituted amino groups, such as amino groups mono- or di-substituted by lower alkyl, loweralkenyl, cycloalkyl or cycloalkenyl groups, and also lower alkylene-amino, oxa-lower alkylene-amino or aza-lower alkylene-amino groups, free or functionally modified hydroxyl or mercapto groups, such as etherified or esterified hydroxyl or mercapto groups, for example, lower alkoxy groups or halogen atoms, and also lower alkylmercapto groups, or free or functionally modified carboxyl, such as carbo-lower alkoxy, carbamyl or cyano groups, as well as heterocyclic residues, especially monocyclic heterocyclic residues of aromatic nature, such as thienyl, furyl or pyridyl residues, which may be substituted as shown for the aromatic residues mentioned below. Optionally substituted aliphatic hydrocarbon residues, such as lower alkyl groups, may contain one, two or more substituents, such as free or functionally modified hydroxyl, for example, lower alkoxy groups.

Cycloaliphatic hydrocarbon residues contain, for example, up to 8 cyclic carbon atoms and are in the first place corresponding cycloalkyl residues, for example, containing 3 to 8, preferably 5 to 6 cyclic carbon atoms, or cycloalkenyl groups, for example, containing 5 to 8, preferably 5 or 6 cyclic carbon atoms, and these alicyclic groups may be mono-, di- or polysubstituted in the cycloaliphatic ring, for example, by lower alkyl groups.

Cycloaliphatic-aliphatic hydrocarbon residues contain, for example, up to 8 cyclic carbon atoms and are in the first place corresponding cycloalkyl-lower alkyl or cycloalkenyl-lower alkyl groups, the cycloaliphatic ring of which being optionally mono-, di- or polysubstituted, for example, by lower alkyl groups.

Araliphatic hydrocarbon residue are especially monocyclic or bicyclic aralkyl or aralkenyl, in the first place phenyl-lower alkyl or phenyl-lower alkenyl, especially benzyl or phenylethyl, such as 1- or 2-phenylethyl, as well as cinnamyl residues, the aromatic nucleus of which may be mono-, di- or polysubstituted, for example, by lower alkyl groups, by free, etherified or esterified hydroxyl or mercapto groups, for example, lower alkoxy, lower alkylenedioxy or lower alkylmercapto groups, or by halogen atoms and/or trifluoromethyl groups.

Aromatic hydrocarbon residues are, for example monocyclic or bicyclic residues of this kind, in the first place phenyl groups which may be substituted, for example, as the aromatic nucleus of the above araliphatic hydrocarbon residue.

Acyl residues of acyl derivatives of compounds, in which hydroxyl groups are acylated, are residues of organic carboxylic acids, especially aliphatic carboxylic acids, such as fatty acids, in the first place lower alkanecarboxylic acids and lower alkanedicarboxylic acids, as well as carbonic acid or its semi-esters, lower alkenecarboxylic acids, lower alkenedicarboxylic acids, higher alkanecarboxylic acids or alkenecarboxylic acids, or cycloaliphatic or cycloaliphatic - aliphatic carboxylic acids, araliphatic or aromatic carboxylic acids, the aromatic nucleus of which may be substituted, for example, as indicated above, or of organic sulphonic acids, such as benzene sulphonic acids the aromatic nucleus of which may be substituted, for example, as indicated above.

Lower alkyl radicals are, for example, methyl, ethyl, propyl, isopropyl, n-butyl, isobutyl, secondary butyl, tertiary butyl, n-pentyl, isopentyl, neopentyl, n-hexyl, isohexyl, n-heptyl or isoheptyl residues, whereas lower alkenyl residues may be, for example, allyl, methallyl or 2-butenyl residues, or lower alkinyl, for example, propargyl residues.

An amino group substituted by lower alkyl radicals is, for example, a di-lower alkyl-amino, e.g. dimethylamino or diethylamino group, a lower alkyleneamino, for example, a pyrrolidino or piperidino group, an oxa-lower alkyleneamino, for example, a morpholino group, or an aza-lower alkyleneamino, for example, a piperazino group.

Suitable lower alkoxy groups are, for example, methoxy, ethoxy, n-propyloxy, isopropyloxy, n-butyloxy, isobutyloxy, n-pentyloxy or n-hexyloxy groups; methylenedioxy groups represent lower alkylenedioxy groups.

Lower alkylmercapto groups are, for example, methylmercapto or ethylmercapto groups.

Halogen atoms are in the first place those having an atomic weight from 19 to 80, that is to say fluorine, chlorine or bromine atoms.

Carbo-lower alkoxy groups are, for example, carbomethoxy or carbethoxy groups, whereas carbamyl groups may be N-mono- or N,N-disubstituted and represent, for example, N-methyl-, N-ethyl- or N,N-dimethylcarbamyl groups.

Pyridyl residues are, for example, 2-, 3- or 4-pyridyl groups, and thienyl and furyl groups are in the first place 2-thienyl and 2-furyl groups, respectively.

In substituted aliphatic hydrocarbon residues, for example, free or substituted amino groups or free or functionally modified hydroxyl or mercapto groups are separated by one or preferably more than one carbon atom of the aliphatic hydrocarbon residue from the oxygen atom that carries such a substituted aliphatic hydrocarbon residue.

Lower aliphatic hydrocarbon residues substituted by hydroxyl or lower alkoxy groups are in the first place hydroxy- or lower alkoxy-lower alkyl groups, in which hydroxyl or lower alkoxy groups are preferably separated by at least 2 carbon atoms from the oxygen atom that carries a lower aliphatic residue substituted in this manner, such as 2-hydroxyethyl, 2-hydroxypropyl, 3-hydroxypropyl, 2-methoxyethyl, 2-ethoxyethyl, 2-methoxypropyl, 3-methoxypropyl or 3-ethoxypropyl or hydroxymethyl groups or 2,3-dihydroxypropyl groups.

Aliphatic hydrocarbon residues substituted by heterocyclic groups are, for example, thienyl-, furyl- or pyridylmethyl, such as thienyl, furfuryl or picolyl residues.

Cycloalkyl radicals are cyclopropyl, cyclobutyl, cyclopentyl, cyclohexyl, or cycloheptyl residues optionally mono-, di- or polysubstituted, for example, by lower alkyl, in the first place methyl groups; the cycloalkenyl residues are 2- or 3-cyclopentenyl, 2- or 3-cyclohexenyl or 2-, 3- or 4-cycloheptenyl residues, optionally substituted as the above cycloalkyl radicals.

Cycloalkyl-lower alkyls are, for example, cyclopentylmethyl, cyclopentylethyl or cyclohexylmethyl residues, and cycloalkenyl-lower alkyl groups are, for example, 2- or 3-cyclohexenylmethyl residues, which may be mono-, di- or polysubstituted, for example, by lower alkyl, especially methyl groups.

Substituted phenyl radicals preferably contain a substituent in 4-position; when several substituents are present, they may be identical or different.

Substituents in the aromatic nucleus of polysubstituted araliphatic hydrocarbon residues, especially in benzyl residues, may be identical or different. A substituted phenyl-lower alkyl, especially benzyl group, preferably contains a substituent in 4-position of the ring.

A lower alkanecarboxylic acid is, for example, formic, acetic, propionic or butyric acid. A lower alkanedicarboxylic acid contains, for example, 2 to 7, preferably 3 to 6, carbon atoms and is, for example, malonic, 2-methylsuccinic, glutaric, 3 - methylglutaric, 3 - ethylglutaric, adipic or pimelic acid, primarily succinic acid. A carbonic acid semi-ester is, for example, a carbonic acid lower alkyl semi-ester, such as ethyl semi-ester. A lower alkenecarboxylic acid contains, for example, 3–7 carbon atoms and is e.g. acrylic acid, whereas a lower alkenedicarboxylic acid contains, for example, 4 to 7 carbon atoms and is, for example, maleic or fumaric acid. Higher alkane- and alkenecarboxylic acid, preferably contain 7–20 carbon atoms and are, for example, myristic, palmitic or stearic and, as well as undecylenic acid. Cycloaliphatic and cycloaliphatic - aliphatic carboxylic acids are, for example, cyclopentanecarboxylic or cyclopentylpropionic acid, whereas an araliphatic carboxylic acid is, for example, phenylacetic acid, and an aromatic carboxylic acid may be, for example, benzoic acid. If desired, the alicyclic or aromatic nuclei of the acids mentioned may be substituted, for example, as indicated above. A benzenesulphonic acid is, for example, a toluenesulphonic acid.

The above glucofuranose compounds have pharmacological, especially anti-inflammatory properties, as can be shown in animal tests, for example, in analogy to the turpentine-pleuritis test of Spector, J. Path. Batc., vol. 72, 367 [1956], for example, in the rat, by intraperitoneal administration of doses of about 0.1 to about 0.3 g./kg. Accordingly, the preparations are useful anti-inflammatory particularly antiexsudative or antiedematous preparations.

Surprisingly, it has been found that glucofuranoses of the Formula I, such as the 3,5,6-tri-O-benzyl-D-glucofuranose, in contrast to corresponding glucofuranosides, that is to say compounds in which the hydroxyl group in 1-position is etherified by an unsubstituted or substituted hydrocarbon residue, such as the ethyl-3,5,6-tri-O-benzyl-D-glucofuranoside are crystalline. In view of the fact that crystalline compounds can be purified under very much milder conditions, for example, by recrystallization, and can be obtained in a superior purity than the corresponding glucofuranosides which are obtained in oily form and are generally purified as much as possible by distillation at temperatures above 200° C. under pressures below 1 mm. Hg, the glucofuranoses of the Formula I, especially those of the Formula Ia and in the first place the 3,5,6-O-tri-benzyl-D-glucofuranose, are especially suitable for use in pharmaceutical preparations. Thus, for instance, certain solid pharmaceuticals such as tablets and suppositories, are much simpler to formulate with the solid glucofuranoses of the Formula I than, for example, with the corresponding glucofuranoside compounds in oily form.

The compounds of the present invention are also useful as starting materials for the manufacture of other, pharmacologically valuable compounds, especially of the corresponding glucofuranosides, which are accessible by treating a compound of the Formula I with an alcohol in the presence of an acid.

Especially valuable are D-glucofuranose compounds in the form, having the formula

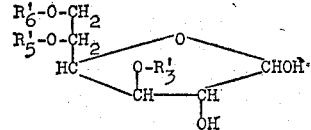

in which $R_3'$, $R_5'$ and $R_6'$ each represents a lower alkyl, e.g. methyl, ethyl, propyl or butyl radical, a lower alkenyl, for example, ally radical, or a cycloalkyl, e.g. cyclopentyl or cyclohexyl radical, or in the first place a benzyl residue the aromatic nucleus of which may be substituted as indicated above, with the proviso that $R_3'$, $R_5'$ and $R_6'$ have together at least 4 carbon atoms, and their acyl derivatives, and, more especially, the 3,5,6-tri-O-benzyl-D-glucofuranose in pure form. These compounds may be in form of α- or β-anomers or of mixtures of anomers.

There should also be mentioned those new D-glucofuranose compounds of the Formula Ia, in which one of the groups $R_3'$, $R_5'$ or $R_6'$ represents a benzyl radical, the phenyl ring of which is substituted by a halogen atom or by a lower alkyl group, and each of the other two represents a benzyl radical the phenyl ring of which is optionally substituted, for example, by lower alkyl groups and/or etherified or esterified hydroxyl groups, such as lower alkoxy or lower alkylenedioxy groups, and/or by halogen atoms or "pseudo-halogen" groups, such as trifluoromethyl groups, and their acyl derivatives with organic carboxylic acids, such as lower alkanecarboxylic or -dicarboxylic acids, as well as salts of compounds that contain a salt-forming group; these compounds may be in the form of the α- or β-anomers or of anomer mixtures. Compounds specially worthy of mention in these series are the 3-O-benzyl-5,6,-di-O-R′-D-glucofuranoses and the 3-O-R′-5,6-di-O-benzyl-D-glucofuranoses, in which R′ represents a benzyl radical the phenyl nucleus of which is substituted in the phenyl nucleus, preferably in p-position, by a halogen, especially chlorine atom or a lower alkyl, especially methyl group, as well as their acyl derivatives with succinic acid and salts, especially non-toxic ammonium salts, alkali or alkaline earth metal salts of acryl derivatives of the above compounds with succinic acid, and more especially the 3-O-(4 - chlorobenzyl)-5,6-di-O-benzyl-D-glucofuranose.

A further group of new compounds having valuable properties are those D-glucofuranose compounds of the Formula Ia, in which $R_3'$ represents a lower aliphatic hydrocarbon residue, especially a lower alkyl or an allyl radical, and $R_5'$ and $R_6'$ each represents a benzyl radical, which is optionally substituted in the phenyl nucleus as indicated above, for example, by a halogen atom or a lower alkyl group, as well as acyl derivatives of such compounds with organic carboxylic acids, for example, lower alkanecarboxylic or -dicarboxylic acids, as well as salts of compounds of the above kind that contain a salt-forming group, which compounds may be in the form of the α- or β-anomers or of anomer mixtures, and in the first place 3-O-$R_3''$-5,6-di-O-R″-D-glucofuranoses, in which $R_3''$ represents a lower alkyl group and R″ is a benzyl radical which is optionally substituted, especially in 4-position, by halogen, especially a chlorine atom, as well as their acyl derivatives with succinic acid, and salts, for example, of the kind mentioned above, of such acyl derivatives, and especially 3-O-n-propyl-5,6,-di-O-(4-chlorobenzyl)-D-glucofuranose.

The above mentioned compounds of the Formula I are obtained, when a compound of the formula

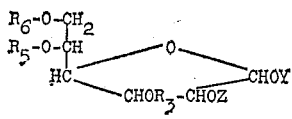

in which Y represents an optionally substituted hydrocarbon residue, and Z is a hydrogen atom or an acyl group, or Y and Z together represent an optionally substituted methylene group X, is treated with an acid in an aqueous medium and a resulting product, if desired, but in any case if it differs from a D-glucofuranose of the Formula Ia, in which one of the groups $R_3'$, $R_5'$ or $R_6'$ represents a benzyl radical, the phenyl ring of which is substituted by a halogen atom or a lower alkyl group, and each of the other two represents a benzyl radical whose phenyl ring is optionally substituted, or in which $R_3'$ represents a lower aliphatic hydrocarbon residue and $R_5'$ and $R_6'$ each stands for a benzyl radical the phenyl ring of which is optionally substituted, or an acyl derivative or a salt of such a compound containing a salt-forming group, is purified and/or, if desired, in a resulting compound an unsaturated residue is converted into a saturated residue, and/or, if desired, a resulting compound is converted into an acyl derivative or a resulting acyl compound is converted into the free hydroxy compound, and/or, if desired, a resulting compound containing a salt-forming grouping is converted into a salt or a resulting salt is converted into the free compound, and/or a resulting anomer mixture is resolved into the constituent anomers.

An optionally substituted hydrocarbon residue representing the group Y is in the first place an organic residue of an alcohol, especially an optionally substituted aliphatic, cycloaliphatic, cycloaliphatic-aliphatic or araliphatic hydrocarbon residue or an optionally substituted aromatic hydrocarbon residue. Residues of this kind are, for example, the above-mentioned, optionally substituted hydrocarbon residues, in the first place, lower alkyl, such as methyl, ethyl, p-propyl, n-butyl or isobutyl radicals, which may be substituted as indicated.

An acyl group Z represents the residue of an organic carboxylic acid, such as one of the above-mentioned acids, especially aliphatic, as well as cycloaliphatic, cycloaliphatic-aliphatic, araliphatic or aromatic carboxylic acids, such as lower alkanecarboxylic acids, for example, acetic acid.

An optionally substituted methylene group X is an unsubstituted or monosubstituted, preferably disubstituted, methylene group. Suitable substituents are in the first place optionally substituted monovalent or divalent aliphatic hydrocarbon residues, preferably lower alkyl, for example, ethyl, n-propyl, isopropyl or n-butyl, especially methyl residues, or lower alkylene radicals containing 4 to 6 chain carbon atoms, such as 1,4-butylene or 1,5-pentylene residues. If desired, these hydrocarbon residues may be substituted, for example, by lower alkyl, hydroxyl or lower alkoxy groups or halogen atoms, as well as by aromatic groups, such as phenyl radicals which themselves may be substituted, for example, by lower alkyl, hydroxyl or lower alkoxy groups or halogen atoms. Further substituents of the methylene group X may also be, for example, aromatic residues which, for example, may be substituted as indicated above, such as phenyl groups or free or functionally modified, such as esterified carboxyl groups, for example, carbo-lower alkoxy, e.g. carbomethoxy or carboethoxy groups.

Acids especially suitable for splitting a glucoside of the Formula II, in which Y is an optionally substituted hydrocarbon residue, are generally Lewis acids, preferably mineral acids, for example, sulphuric acid, or especially hydrohalic acids, in the first place hydrochloric acid, and also organic acids, such as organic carboxylic acids, e.g. acetic acid, or organic sulphonic acids, for example, p-toluenesulphonic acid, or, if desired, mixtures of acids, for example, of acetic acid with hydrochloric acid or p-toluenesulphonic acid, and salts that have the character of Lewis acids. Particularly valuable is acetic acid, for example, aqueous acetic acid of over about 40% especially about 50% to about 70%, strength, and also aqueous mixtures of acids, such as acetic and sulphuric acid. The reaction may be performed in a heterogeneous or homogeneous phase and can, if desired, be accelerated by adding a catalyst, such as a catalytic amount of phosphoric acid.

Starting materials of the Formula II, in which the groups Y and Z are joined and represent an optionally substituted methylene group X, are treated in an aqueous medium with an acid, such as one of the Lewis acids mentioned above, especially with a mineral acid, such as hydrochloric or sulphuric acid, or with an organic carboxylic acid, such as formic or oxalic acid, if desired, in an organic solvent e.g. acetic acid.

The above reactions are preferentially performed in the presence of a diluent (for which purpose the aqueous acid reagent may in general also be used as diluent), if necessary, with cooling, in the first place, however, at room temperature or at an elevated temperature (for example from about 25° C. to above 150° C.), if necessary, under increased pressure and/or in an inert gas, such as nitrogen.

As mentioned above, it has been observed that surprisingly glucofuranoses of the Formula I are obtained in crystalline form so that, compared with corresponding glucofuranosides, they can be purified in a much simpler manner, especially under milder conditions, for example, by recrystallization, and converted into a highly pure form, for instance freed from degradation products which may possibly form in high-vacuum distillations and at high temperatures. It goes without saying that the process products may also be purified e.g. by adsorption on an adsorbent and elution (including column, layer and paper chromatography) or by distillation.

In a compound obtained by the present process, an unsaturated residue, such as a lower aliphatic hydrocarbon residue, for example, a lower alkenyl, such as an allyl group, may be saturated in known manner, for example, by treatment with catalytically activated hydrogen, for example, hydrogen in presence of a palladium catalyst.

A resulting compound acylated in 2-position can be converted into the 2-hydroxy compound in the usual manner, such as by hydrolysis, for example, by treatment with an alkaline agent, such as an aqueous solution of an alkali or alkaline earth metal hydroxide or carbonate, or with silver oxide in an aqueous or alcoholic medium.

A resulting compound containing free hydroxyl groups can be acylated in the usual manner, for example, by treatment with an acylating agent capable of introducing the acyl residue of an organic carboxylic or sulphonic acid. Suitable agents are acid derivatives (in the case of dicarboxylic acids, for example, also their monoacid derivatives), especially anhydrides (including inner anhydrides, such as corresponding ketenes), or halides, especially chlorides. According to a preferred process, the reaction with the anhydride, for example, succinic acid anhydride, is performed in the presence of an acidic or basic catalyst, for example, pyridine. The reaction with carboxylic acid halides, for example, a chloride, such as succinic acid monochloride, may be performed in the presence of an acid-accepting condensing agent, such as a tertiary base or sodium acetate. A free hydroxyl group may also be esterified with the aid of a carboxylic acid in the presence of a suitable condensing agent, such as dicyclohexylcarbodiimide, or of a reactive ester of a carboxylic acid, such as an ester with N-hydroxyamino or N-hydroxyimino compounds.

Depending on whether they contain salt-forming groups, such as free carboxyl groups or free or substituted amino groups, the compounds may be in free form or in the form of their salts, especially pharmaceutically acceptable non-toxic salts, which may, for example, be distinguished by their good solubility in water. Compounds containing acid groups may be, for example, in form of their metal salts, especially alkali metal, for example, sodium or potassium salts, or alkaline earth metal, for example, magnesium or calcium salts, or ammonium salts, for example, salts with ammonia or an organic base, such as a tri-lower alkylamine, e.g., trimethylamine or triethylamine. Compounds containing basic groups may form salts with inorganic acids such as hydrohalic acids, for example, hydrochloric or hydrobromic acid, sulphuric, phosphoric, nitric or perchloric acid, or with organic, such as aliphatic, alicyclic, aromatic or heterocyclic carboxylic acids or sulphonic acids, for example, formic, acetic, propionic, oxalic, succinic, glycollic, lactic, malic, tartaric, citric, ascorbic, hydroxymaleic, dihydroxymaleic, pyruvic, phenylacetic, benzoic, 4-aminobenzoic, anthranilic, 4-hydroxybenzoic, salicylic, p-aminosalicylic, methanesulphonic, ethanesulphonic, hydroxyethanesulphonic, ethylenesulphonic, toluenesulphonic, naphthalenesulphonic, N-cyclohexylsulphamic or sulphanilic acid.

The salts, which may also be used for purifying the free compounds, are obtained in known manner, for example, by treating compounds capable of forming acid addition salts with acids or suitable ion exchange resins, or compounds capable of forming metal or ammonium salts with a metal hydroxide or carbonate or with ammonia or an amine or with an appropriate ion exchange resin.

Resulting salts can be converted into the free compounds, acid addition salts, for example, by treatment with basic agents, the metal and ammonium salts, for example, by treatment with an acidic agent.

In view of the close relationship between the new compounds in free form and in form of their salts, what has been said above and hereinafter referring to the free compounds or the salts concerns also the corresponding salts and free compounds, respectively, wherever possible and suitable.

A resulting anomer mixture can be resolved into the pure α- and β-anomers in the usual manner, for example, on the basis of the physio-chemical differences of the constituent anomers, for example, by chromatography (such as column, thin-layer or paper chromatography) and/or by fractional crystallization. Preferably the more active of the two anomers is isolated.

The process steps described above are carried out by known methods, for example, in the absence or preferably presence of a diluent or solvent, if necessary, with cooling or heating, under superatmospheric pressure and/or in an inert gas.

The invention includes also any modification of the process, in which an intermediate obtained at any stage of the process is used as starting material and any remaining process steps are carried out or the process is discontinued at any stage thereof, or a starting material is formed under the reaction conditions or is used in form of a reactive derivative thereof.

Preferred starting materials are those which give rise to the formation of the compounds mentioned above as being preferred.

The starting materials used in the process of this invention, which may be used as anomer mixtures or pure anomers, can be prepared in known manner. Thus, for example, they are obtained when in a glucofuranose the hydroxyl groups in 1- and 2-positions and, if desired, in 5- and 6-positions, are protected by introduction of protective groups, for example, of the group X, which represents especially an isopropylidene or benzylidene group. The hydroxyl group in 3-position and, if desired, the hydroxyl groups in 5- and 6- positions, can then be etherified by treatment with a reactive ester of an alcohol, for example, an appropriate halide, for example, chloride or bromide, or with an appropriate sulphonyloxy compound, in the presence of a basic agent, such as an alkali metal hydroxide, for example, sodium or potassium hydroxide, or an alkali metal carbonate, for example, sodium or potassium carbonate. The etherification of a hydroxyl group in 3-position with a reactive ester of an alcohol can be performed under suitable conditions, for example, in the presence of silver oxide or of an alkali metal carbonate, for example, potassium carbonate, also on the 3,5,6-trihydroxy compound, without the hydroxyl groups in the 5- and 6-position groups being etherified as well.

In a resulting intermediate which contains protected hydroxyl groups in 5- and 6-positions, the latter can be liberated, if desired, selectively, that is to say without liberating the hydroxyl groups in 1- and 2-positions, for example, by treatment with an acid, such as 60% aqueous acetic acid (for example at 35° C.) or aqueous ethanolic hydrochloric acid and then themselves be etherified, for example, with the use of a reactive alcohol, such as the corresponding halides, e.g. chlorides or bromides, and sulphonyloxy, e.g. p-toluenesulphonyloxy compounds, in the presence of a basic agent, such as an alkali metal, e.g. potassium, hydroxide. If desired, this reaction may be performed stepwise, since the primary hydroxyl group in 6-position can, for example, by treatment with an approximately equivalent quantity of a reactive ester of an alcohol in the presence of an approximately equivalent quantity of an alkali metal hydroxide or in the presence of silver oxide, be etherified before the hydroxyl group in 5-position. It is also possible to esterify selectively the hydroxyl group in 6 position in a 5,6-dihydroxy compound which contains in 3-position an etherified hydroxyl group, for example, by treatment with a suitable organic sulphonyl halide, such as p-toluenesulphonylchloride, in the presence of a base, such as pyridine, whereupon by reaction with a suitable basic agent, such as an alkali metal lower alkoxide, such as sodium ethoxide, the 5,6- epoxy compound can be formed. When this epoxide is split with an alcohol in the presence of a transesterifying catalyst, for example, an alkali metal, e.g. sodium, compound of an alcohol, the 5-hydroxy compound etherified in 6-position is obtained, in which the free hydroxyl group in position 5 can be selectively etherified, for example, by treatment with a reactive ester of an alcohol, in the presence of a basic agent.

In the starting materials obtained by the processes mentioned above the protective group for the two hydroxyl groups in 1- and 2-positions can be eliminated under anhydrous conditions, for example, by treatment with an alcohol, especially a lower alkanol, such as methanol, ethanol, n-propanol, isopropanol, n-butanol, isobutanol or secondary butanol, in the presence of an acid, especially one of the mineral acids mentioned above, such as hydrochloric acid; this elimination leads to the formation of a glucofuranoside compound of the Formula II, in which Y represents an unsubstituted or substituted hydrocarbon residue and Z stands for a hydrogen atom. In these resulting compounds the free hydroxyl group in position 2 may be acylated in the usual manner, for example, as described above. A resulting anomer mixture of starting materials may be resolved into its constituent anomers, for example, in the manner described above.

The present invention also concerns pharmaceutical preparations containing as active ingredients glucofuranos compounds of the Formula I, in which $R_3$, $R_5$ and $R_6$ each represents an optionally substituted hydrocarbon residue, the latter having the above given meaning, and one of them may also be a hydrogen atom, or acyl derivatives thereof.

The above compounds have the configuration of D-glucofuranose; the hydroxyl group in 1-position may have the α- or β-configuration and the compounds of this invention may be in form of anomers or of mixtures of isomers.

Especially valuable as active ingredients of the present preparations are D-glucofuranose compounds of the formula

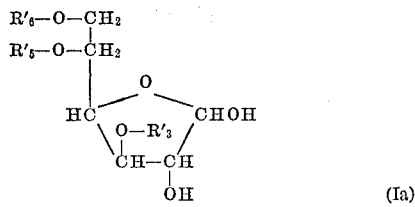

(Ia)

in which $R_3'$, $R_5'$ and $R_6'$ each represents a lower alkyl, for example, methyl, ethyl, propyl or butyl radical, a lower alkenyl, for example, allyl radical or a cycloalkyl, for example cyclopentyl or cyclohexyl radical, or in the first pace a benzyl residue the aromatic nucleus of which may be substituted as indicated above, and their acyl derivatives, and more especially the 3,5,6-tri-O-benzyl-D-glucofuranose. These compounds may be in form of α- or β-anomers or of mixtures of anomers.

Further mention deserve those new D-glucofuranose compounds of the Formula Ia, in which one of the residues $R_3'$, $R_5'$ and $R_6'$ stands for a benzyl radical, the phenyl ring of which is substituted by a halogen atom or a lower alkyl group, and each of the others represents a benzyl residue the phenyl ring is optionally substituted, for example, by lower alkyl groups and/or etherified or esterified hydroxyl groups, such as lower alkoxy or lower alkylenedioxy groups, and/or halogen atoms and also "pseudo-halogen" groups, such as trifluoromethyl groups, and their acyl derivatives with organic carboxylic acids, as well as salts of compounds of the above-mentioned kind that contains a salt-forming group; these compounds may be in the form of α- or β-anomers or of mixtures of anomers.

Among these compounds the D-glucofuranose compounds of the Formula Ia are particularly valuable, in which one of the groups $R_3'$, $R_5'$ and $R'$ is a benzyl residue the phenyl nucleus of which is substituted by a halogen, especially chlorine, atom, or by a lower alkyl, especially methyl, group, the substituent of the phenyl nucleus being preferably in para-position, and each of the other two groups represents a benzyl radical, the phenyl nucleus is unsubstituted or substituted by a lower alkyl, especially methyl group, a lower alkoxy, especially methoxy group or a trifluoromethyl group or a halogen, especially chlorine atom, a substituent in the phenyl nucleus of a benzyl radical being preferably in para-position, and their acyl derivatives with lower alkanecarboxylic or dicarboxylic acids, such as succinic acid, and salts, especially non-toxic ammonium salts, alkali or alkaline earth metal salts of acyl derivatives of the above compounds with a lower alkanedicarboxylic acid, especially succinic acid.

Preferred compounds of this type are those D-glucofuranose compounds of the above Formula Ia, in which two of the groups $R_3'$, $R_5'$ and $R_6'$, preferably the residues $R_5'$ and $R_6'$, are benzyl radicals, the phenyl nucleus of which is substituted by a halogen, especially chlorine atom, or a lower alkyl, especially methyl group, and the third residue is a benzyl radical the phenyl nucleus of which is unsubstituted or substituted by a lower alkyl, especially methyl, lower alkoxy, especially methoxy or trifluoromethyl group or a halogen, especially chlorine atom, the substituent of the phenyl nucleus of a benzyl radical preferably being in the para-position, and their acyl derivatives with lower alkanecarboxylic or -dicarboxylic acids, such as succinic acid, and salts, especially non-toxic ammonium, alkali metal or alkaline earth metal salts of acyl derivatives of the above compounds with a lower alkanedicarboxylic acid, such as succinic acid.

A particularly pronounced pharmacological activity of the above kind is found in 3-O-benzyl-5,6,-di-O-R'-D-glucofuranoses or 3-O-R'-5,6-di-O-benzyl-D-glucofuranoses, in which R' represents a benzyl radical substituted in the phenyl nucleus, preferably in para-position, by a halogen, especially chlorine, atom, or a lower alkyl, especially methyl group, and their acyl derivatives with succinic acid and salts, for example, of the above-mentioned kind, of such acyl derivatives, and more especially the 3-O-(4-chlorobenzyl)-5,6-di-O-benzyl-D-glucofuranose.

Another valuable group of the above-mentioned active substances for use in the present preparations are those D-glucofuranose compounds of the Formula Ia, in which $R_3'$ represents a hydrogen atom or a lower aliphatic hydrocarbon residue, and $R_5'$ and $R_6'$ each represents a benzyl radical the phenyl nucleus of which is optionally substituted, as well as acyl derivatives of such compounds with organic carboxylic acids and also salts of compounds of the above kind that contain a salt-forming group; these compounds may take the form of α- or β-anomers or of mixtures of anomers.

Within this group of active substances a particularly valuable anti-inflammatory activity is found with those D-glucofuranose compounds of the Formula Ia, in which $R_3'$ represents a hydrogen atom or a lower alkyl or an allyl radical, and $R_5'$ and $R_6'$ each is a benzyl group the phenyl ring of which may contain, preferably in the para-position, a lower alkyl, especially methyl group or a halogen, especially chlorine atom, and their acyl derivatives with lower alkanecarboxylic or -dicarboxylic acids, such as succinic acid, and salts, such as non-toxic ammonium, alkali metal or alkaline earth metal salts of acyl derivatives of the above compounds with a lower alkanedicarboxylic acid, especially succinic acid.

From among these compounds having pronunced pharmacological activities of the above type there may be specially mentioned those 3-O-$R_3''$-5,6-di-O-R''-D-glucofuranoses, in which $R_3''$ represents a hydrogen atom or in the first place a lower alkyl group, and R" represents a benzyl radical, the phenyl residue of which is unsubstituted or substituted, preferably in 4-position, by a halogen, especially chlorine atom, as well as their acyl derivatives with succinic acid, and salts, for example, of the kind mentioned above, of such acyl derivatives, and more, especially the 3-O-n-propyl-5,6-di-O-(4-chlorobenzyl)-D-glucofuranose.

The new preparations are formulated in a known manner by mixing the active ingredient with suitable excipients. The latter are organic or inorganic, solid or liquid substances suitable for enteral, for example, oral, parenteral or topical administration, especially those which are inert towards the active substance, such, for example, as water, gelatin, sugars, such as lactose, glucoses or sucrose, starches, such as corn tarch, wheat starch, rice starch or arrowroot, stearyl alcohol, searic acid or salts thereof, such as magnesium or calcium stearate, talcum, vegetable oils, benzyl alcohols, gums, ethanol, propyleneglycol, polyalkyleneglycols or other known medicinal excipients. The pharmaceutical preparations may be in solid form, for example, as tablets, dragees, capsules or suppositories, or in liquid form, for instance, as solutions (such as elixirs or syrups) or suspensions, or they may be in the form of emulsions, for example, ointments or creams. They may be sterilized and/or may contain auxiliary substances, such as preserving, stabilizing, wetting or emulsifying agents, solubilizers, salts for regulating the osmotic pressure or buffers. They may also contain additional pharmacologically valuable substances.

The pharmaceutical preparations contain about 10% to 100%, preferably about 25% to about 95% of the active ingredient. Preparations for enteral, for example, oral, administration contain about 0.1 g. to about 0.5 g., preferably about 0.2 to about 0.4 g., of the active substance per dosage unit. The quantity of excipient used may vary within wide limits and depends mainly on the form of administration. The daily dose depends closely on the form of application and the requirements of the individual patient; it is easy to determine by the physician in attendance and is usually twice to four times the dosage unit.

The invention also includes a process for the treatment of inflammations, characterized in that glucofuranoses of the Formula I, especially of the Formula Ia, preferably in form of the pharmaceutical preparations described above, are given to warm-blooded beings.

The following examples illustrate the invention; temperatures are given in degrees centigrade.

EXAMPLE 1

A suspension of 500 g. of crude ethyl-3,5,6-tri-O-benzyl-D-glucofuranoside in 500 ml. of 50% aqueous acetic acid is vigorously stirred for 16 hours while being heated under nitrogen at an internal temperature of 70°. The light-yellow suspension is then cooled to 30° and completely evaporated under reduced pressure at a bath temperature of 35°. The residue, which forms a mobile syrup, is dissolved in 1200 ml. of toluene, washed with a saturated aqueous sodium hydrogen carbonate solution, then with water until the washings run neutral and dried over magnesium sulphate. When 4200 ml. of hexane are added portionwise, 3,5,6-tri-O-benzyl-D-glucofuranose of the formula

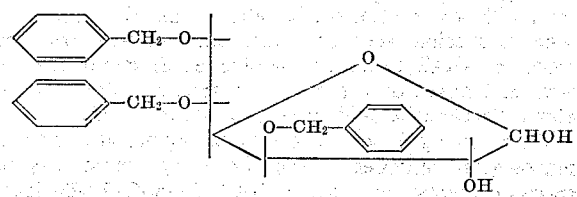

precipitates as a crystalline, substantially colorless product. On redissolution at 0° in 2 parts by volume of a 1:1-mixture of ethanol and water, a completely colorless product is obtained, F. 68–71°; $[\alpha]_D^{20} = -30° \pm 1°$ (c.=1 in chloroform). According to its thin-layer chromatogram on silicagel, the product is pure; $R_f=0.18$ (system: 70:30 cyclohexane and acetone); $R_f=0.32$ (system: 85:15 chloroform and acetone) and $R_f=0.40$ (system 50:50 chloroform and ethyl acetate).

EXAMPLE 2

A suspension of 10 g. of crude ethyl-3,5,6-tri-O-benzyl-D-glucofuranoside in 100 ml. of an 8:2-mixture of 50% aqueous acetic acid and acetonitrile is vigorously stirred for 24 hours while being heated under nitrogen at an internal temperature of 70°. The light-yellow suspension is cooled to 30°, and completely evaporated under reduced pressure at a bath temperature of 35°; the residue is dissolved in 100 ml. of chloroform. The organic solution is washed with a 1 N-aqueous potassium bicarbonate solution and then with water until the washings run neutral, dried over magnesium sulfate and evaporated under reduced pressure at a bath temperature of 30°. To remove all residual solvent, the residue is heated for 1 hour at a bath temperature of 40° under a high vacuum, whereupon spontaneous crystallization occurs. The product is dissolved in 10 ml. of toluene and 50 ml. of hexane are added portionwise to precipitate the completely colorless 3,5,6-tri-O-benzyl-D-glucofuranose, F. 67–70°.

EXAMPLE 3

A solution of 9.8 g. of 1,2-O-isopropylidene - 3,5,6-tri - O - benzyl - $\alpha$ - D - glucofuranose in 90 ml. of ethanol is mixed with 10 ml. of 10 N-hydrochloric acid and vigorously stirred for 1 hour under nitrogen at an internal temperature of 70°. The light-yellow solution is cooled to 10°, adjusted to pH 6–7 with a 2 N aqueous potassium hydroxide solution and evaporated under reduced pressure at a bath temperature of 35°. The residue contains the ethyl - 3,5,6 - tri - O - benzyl - D - glucofuranoside, which is suspended in 100 ml. of 50% aqueous acetic acid and stirred for 8 hours under nitrogen at an internal temperature of 70°. The light-yellow suspension is worked up as described in Example 1 and yields the 3,5,6-tri-O-benzyl-D-glucofuranose, F. 67–70°, which, according to thin-layer chromatogram on silicagel, is pure.

EXAMPLE 4

A suspension of 9.8 g. of 1,2 - O - isopropylidene-3,5,6 - tri - O - benzyl - $\alpha$ - D - glucofuranose in a mixture of 65 ml. of glacial acetic acid and 35 ml. of 1 N aqueous sulphuric acid is vigorously stirred for 30 minutes under nitrogen at an internal temperature of 80°. The light-yellow, clear reaction solution is cooled to 10°, adjusted to pH 2–3 with 40 ml. of a 2 N aqueous sodium hydroxide solution and evaporated under reduced pressure at a bath temperature of 35°. The concentrate is dissolved in 100 ml. of chloroform, washed with a 1 N aqueous potassium bicarbonate solution and then with water until the washings run neutral and dried over magnesium sulphate. The chloroform solution is evaporated under reduced pressure and the residue is completely freed from residual solvent by being heated at a bath temperature of 40° under a high vacuum for 1 hour. The oily residue is dissolved in 40 ml. of ethyl acetate and crystallized by the portionwise addition of 480 ml. of hexane. The resulting colorless 3,5,6 - tri-O-benzyl-D-glucofuranose melts at 68–70°.

EXAMPLE 5

A solution of 10 g. of crude ethyl - 3,5,6 - tri - O-benzyl-D-glucofuranoside [prepared by the process disclosed in Swiss Pat. No. 391,679] in 500 ml. of glacial acetic acid is mixed with 2.4 ml. of phosphoric acid and diluted by stirring in 500 ml. of water. The milky suspension is heated for 4 hours at 70° internal temperature, then cooled to 20° and treated with 10.7 ml. of a 10 N aqueous sodium hydroxide solution. The reaction mixture is concentrated on a waterbath at 40–50° under reduced pressure to a volume of 30 ml.; the concentrate is dissolved in 50 ml. of toluene with heating at 40° and the solution is diluted with an equal amount of toluene. The organic solution is washed twice with 100 ml. of a saturated aqueous sodium bicarbonate solution and then with water (which may be replaced by a saturated aqueous sodium chloride solution), until the washings run neutral, dried over sodium sulphate, filtered and made up with toluene to a total volume of 100 ml. The mixture is diluted with 100 ml. of petroleum ether (fraction 60–90°), mixed with 0.3 g. of an active charcoal preparation, boiled for a few minutes and filtered while still hot; the colorless filtrate is stirred and mixed with 500 ml. of petroleum ether. The resulting emulsion is cooled in ice water while being stirred, allowed to stand for several hours at 0° and filtered. The crystalline 3,5,6-tri-O-D-glucofuranose is filtered off and washed four times with 50 ml. each of petroleum ether, F. 64–66° (uncorrected); $[\alpha]_D^{20} = -30°$ (c.=1 in chloroform).

EXAMPLE 6

A suspension of 10 g. of 1,2-O-isopropylidene-3,5,6-tri-O-benzyl-α-D-glucofuranose in 1000 ml. of 50% aqueous formic acid is stirred for 6 hours at 70° and then extracted with toluene. The organic phase is washed with a saturated aqueous sodium bicarbonate solution and then with water until the washings run neutral, dried over sodium sulphate, filtered and made up to 100 ml. volume with toluene. The mixture is diluted with 100 ml. of petroleum ether (boiling range 60–90°), treated with 0.3 g. of active charcoal, refluxed for a few minutes and filtered while still hot. After cooling to 30°, the filtrate, while stirring, is diluted portionwise with a total of 50 ml. of petroleum ether. The mixture is kept for a few hours at 0° after completion of the addition and yields the 3,5,6-tri-O-benzyl-D-glucofuranose in form of colorless, fine needles; F. 64–66°.

When 70% aqueous formic acid is used, the concentration of 1,2-O-isopropylidene-3,5,6-tri-O-benzyl-D-glucofuranose can be trebled.

EXAMPLE 7

A mixture of 1000 ml. of 50% acetic acid, 25 ml. of phosphoric acid (spec. gravity 1.71) and 10 g. of 1,2-O-isopropylidene-3,5,6-tri-O-benzyl-α-D-glucofuranose is stirred for 6 hours at 70°; then, while cooling (internal temperature below 25°), the phosphoric acid is neutralized with the theoretical quantity of a 10 N aqueous sodium hydroxide solution and the mixture is evaporated as completely as possible at 50° under reduced pressure. After dilution with water to the original volume and renewed evaporation, the excess acetic acid has been practically removed and the residue is extracted with toluene. The organic phase is worked up as described in Example 6 to yield the 3,5,6-tri-O-benzyl-D-glucofuranose, F. 65° (uncorrected).

EXAMPLE 8

To a solution of 10 g. of oxalic acid dihydrate in 100 ml. of 50% aqueous acetic acid (prepared while heating) are added 0.24 ml. of phosphoric acid (spec. gravity 1.71) and then 1 g. of 1,2-O-isopropylidene-3,5,6-tri-O-benzyl-D-α-glucofuranose, and the mixture is heated for 3½ hours at 70°. The oxalic acid and the phosphoric acid are neutralized with the theoretical quantity of a 5 N aqueous sodium hydroxide solution and the mixture is evaporated as much as possible at 50° under reduced pressure, the evaporation being repeated several times with addition of water on each occasion. The concentrate is taken up in sufficient water and extracted with toluene. The organic phase is worked up as described in Example 6 and furnishes 3,5,6-tri-O-benzyl-D-glucofuranose.

EXAMPLE 9

A suspension of 5 g. of 1,2-O-isopropylidene-3-O-n-propyl-5,6-di-O-(4-chlorobenzyl)-α-D-glucofuranose in a mixture of 35 ml. of glacial acetic acid and 17.5 ml. of 1 N aqueous sulfuric acid is vigorously stirred for 30 minutes under nitrogen at an internal temperature of 80°, then cooled to 10°, adjusted to pH 2–3 with a 2 N aqueous sodium hydroxide solution and evaporated at a bath temperature of 35°. The concentrate is extracted with ether, and the organic phase is washed with a saturated aqueous sodium bicarbonate solution and then with water until the washings run neutral, dried over magnesium sulphate and evaporated. The residue is 3-O-n-propyl-5,6-di-O-(4-chlorobenzyl)-D-glucofuranose of the formula

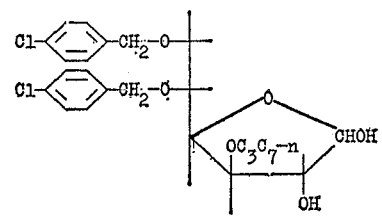

The thin-layer chromatogram on silicagel in the system chloroform and ethyl acetate (85:15) shows an $R_f$ value of 0.12. After recrystallization from a 1:3-mixture of toluene and hexane and cooling at −17°, the product melts at 60°.

The starting material used above may be prepared as follows:

A solution of 32 g. of 1,2-O-isopropylidene-3-O-n-propyl-α-D-glucofuranose in 100 ml. of absolute dioxane is mixed with 87:5 g. of powdered potassium hydroxide. In the course of 30 minutes 131 g. of 4-chlorobenzyl chloride in 50 ml. of absolute dioxane are added dropwise while stirring and the mixture is allowed to react for 5 hours at 80°. The excess of 4-chlorobenzyl chloride is distilled off with steam, the residue is allowed to cool and is extracted with chloroform. The organic solution is washed with water, dried over sodium sulphate and evaporated under reduced pressure. The residue is distilled and yields the 1,2-O-isopropylidene-3-O-n-propyl-5,6-di-O-(4-chlorobenzyl)-α-D-glucofuranose as a slightly yellowish oil, B.P. 230°/0.015 mm. Hg; $[\alpha]_D^{20} = -22° \pm 1°$ (c.=1 in chloroform).

EXAMPLE 10

The 3-O-n-propyl-5,6-di-O-(4-chlorobenzyl)-D-glucofuranose described in Example 9 is also obtained when 15 g. of ethyl-3-O-n-propyl-5,6-di-O-(4-chlorobenzyl)-D-glucofuranoside are treated with 600 ml. of glacial acetic acid and 600 ml. of water, the mixture is heated for 16 hours at 70°, the excess acetic acid is distilled off, the aqueous residue is extracted with ether and the ether solution is worked up as described in Example 9.

The starting material may be prepared as follows:

A solution of 40 g. of 1,2-O-isopropylidene-3-O-n-propyl-5,6-di-O-(4-chlorobenzyl)-α-D-glucofuranose in 900 ml. of a 1 N ethanolic solution of hydrogen chloride is kept for 17 hours at room temperature, cooled to 0–5° and then neutralized with a 10 N aqueous sodium hydroxide solution. The bulk of ethanol is distilled off under reduced pressure and the residue is extracted with chloroform. The organic extract is washed with an aqueous sodium bisulfite solution and with water, dried over sodium sulphate and evaporated under reduced pressure. The residue is distilled to yield the ethyl-3-O-n-propyl-5,6-di-O-chlorobenzyl)-D-glucofuranoside as a slightly yellowish oil, B.P. 220°/0.03 mm. Hg; $[\alpha]_D^{20} = -24° \pm 1°$ (c.=1 in chloroform).

EXAMPLE 11

A suspension of 9.8 g. of 1,2-O-isopropylidene-3-O-(4 - chlorobenzyl)-5,6-di-O-benzyl-α-D-glucofuranose in a mixture of 70 ml. of glacial acetic acid and 35 ml. of 1 N aqueous sulfuric acid is vigorously stirred for 30 minutes under nitrogen at an internal temperature of 80°. The reaction mixture is then cooled to 10°, adjusted to pH 2–3 with a 2 N aqueous sodium hydroxide solution and evaporated under reduced pressure at a bath temperature of 35°. The concentrate is extracted with ether, and the organic phase washed with water, dried over sodium sulphate and evaporated. The residue is 3-O-(4 - chloro-benzyl)-5,6-di-O-benzyl-D-glucofuranose of the formula

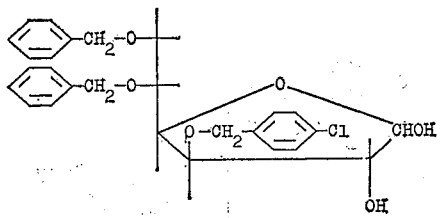

which can be crystallized from a mixture of ether and petroleum ether and melts at 76–79°; $[\alpha]_D^{20} = -39° \pm 1°$ (c.=1 in chloroform).

The starting material used above may be prepared as follows:

A solution of 520 g. of 1,2;5,6-bis-O-isopropylidene-α-D-glucofuranose in 2500 ml. of absolute dioxane is mixed with 1610 g. of 4-chlorobenzyl chloride. Within 1 hour, while stirring vigorously at 50°, 620 g. of powdered potassium hydroxide are added in 4 portions. The reaction mixture is heated for 2 hours at 80–90°, the excess 4-chlorobenzyl chloride is distilled off with steam and, after cooling, the residue is extracted with chloroform. The organic solution is dried over sodium sulphate and evaporated under reduced pressure. The residue is distilled and yields 1,2;5,6-bis-O-isopropylidene-3-O-(4-chlorobenzyl)-α-D-glucofranose as a slightly yellowish oil, B.P. 150–152°/0.15 mm. Hg; $[\alpha]_D^{20} = -27° \pm 1°$ (c.=1 in chloroform).

A solution of 614 g. of 1,2;5,6-bis-O-isopropylidene-3-O-(4-chlorobenzyl-α-D-glucofuranose in 1685 ml. of glacial acetic acid and 945 ml. of water is heated and stirred for 6 hours at an internal temperature of 35°, then evaporated to about half the volume under reduced pressure and, in the cold, neutralized with a 10 N aqueous sodium hydroxide solution, then extracted with chloroform. The organic extract is washed with water, dried over magnesium sulphate and evaporated under reduced pressure. The residue is degassed at 60° under a high vacuum until its weight remains constant.

A solution of the resulting crude 1,2-O-isopropylidene-3-O-(4-chlorobenzyl)-α-D-glucofuranose in 200 ml. of absolute dioxane is mixed with 70.3 g. of powdered potassium hydroxide and, while being stirred for 30 minutes, treated with 132 g. of benzyl chloride. The reaction mixture is heated for 5 hours at 80°, the excess benzyl chloride is distilled off with steam and, after cooling, the residue is extracted with chloroform. The organic extract is washed with water, dried over sodium sulphate and evaporated under reduced pressure. The residue is degassed for 4 hours at 100° under a high vacuum and yields the crude 1,2-O-isopropylidene - 3 - O-(4-chlorobenzyl)-5,6-di-O-benzyl-α-D-glucofuranose; $[\alpha]_D^{20} = -45° \pm 1°$ (c.=1 in chloroform). The product can be purified by distillation at 250–260°/0.01 mm. Hg in a molecular distillation apparatus.

EXAMPLE 12

The 3-O-(4-chlorobenzyl)-5,6-di-O-benzyl-D-glucofuranose described in Example 11 can also be obtained by treating 15 g. of isobutyl-3-O-(4-chlorobenzyl)-5,6-di-O-benzyl-D-glucofuranoside with 600 ml. of glacial acetic acid and 600 ml. of water, heating the mixture for 16 hours at 70°, distilling off the excess acetic acid, extracting the aqueous residue with ether and working up the ether solution as described in Example 14.

The starting material may be prepared thus:

A solution of 23 g. of 1,2-O-isopropylidene-3-O-(4-chlorobenzyl)-5,6-di-O-benzyl-α-D-glucofuranose in 600 ml. of a 1 N solution of dry hydrochloric gas in isobutanol is kept for 22 hours at room temperature, then cooled to 0–5°, neutralized with a 10 N aqueous sodium hydroxide solution and the organic phase is separated and washed with a small quantity of water. The bulk is distilled off under reduced pressure in a rotary evaporator and the residue is extracted with chloroform. The organic extract is washed with an aqueous sodium bisulfite solution and with water, dried over sodium sulfate and evaporated under reduced pressure. The residue is degassed in a high vacuum (0.05 mm. Hg) at a temperature of 130° and the desired isobutyl-3-O-(4-chlorobenzyl)-5,6-di-O-benzyl-D-glucofuranoside is obtained as a thickly liquid oil; $[\alpha]_D^{20} = -50° \pm 1°$ (c.=1 in chloroform).

EXAMPLE 13

A solution of 15 g. of 3,5,6-tri-O-benzyl-D-glucofuranose in 15 ml. of absolute pyridine is treated with 15 ml. of acetic acid anhydride and allowed to stand at room temperature for 15 hours, then cooled to 0–5° and treated with 15 ml. of water. The resulting oil is separated and dissolved in ether; the organic solution is washed with ice-cold 2 N hydrochloric acid and ice-water, dried over sodium sulfate and evaporated. The residue is distilled and one obtains the 1,2-di-O-acetyl-3,5,6-tri-O-benzyl-D-glucofuranose of the formula

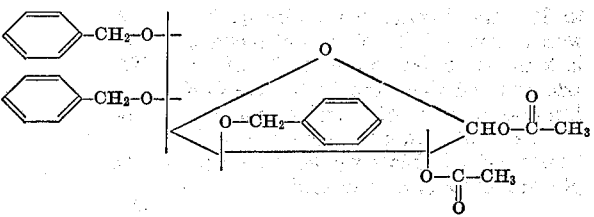

which is obtained at 240°/0.01 mm. Hg;

$$[\alpha]_D^{20} = -17° \pm 1°$$

(c.=1.07 in chloroform).

The above glucofuranose compounds may be used in the following manner for the preparation of corresponding glucofuranoside compounds:

EXAMPLE A

A solution of 220 g. of 3,5,6-tri-O-benzyl-D-glucofuranose in 2200 ml. of absolute ethanol, containing 15.6 g. of hydrogen chloride gas is allowed to stand for 1 hour at room temperature and under a nitrogen atmosphere. The reaction mixture is adjusted to pH 7–7.5 by adding an aqueous sodium hydroxide solution (30%) whilst cooling in an ice bath; the inorganic precipitate is filtered-off and twice washed with 100 ml. portions each of ethanol. The combined filtrates are concentrated to a volume of 1100 ml. at 20–25° under reduced pressure and the concentrated solution is diluted by adding 880 ml. of water in the course of 15 minutes. After allowing to stand for 15 hours at room temperature and under a nitrogen atmosphere, the colorless oily layer is separated and dissolved in 1000 ml. of absolute ether and the solution is dried over sodium sulphate and evaporated. The residue is degassed for 2 hours under reduced pressure and at 40–50° and the ethyl-3,5,6-tri-O-benzyl-D-glucofuranoside is obtained in the form of a clear colorless viscous liquid. The product, in a thin layer chromatogram on silica gel (containing calcium sulfate) in chloroform or in a 70:30 mixture of cyclohexane:acetone or in an 85:15 mixture of chloroform and ethyl acetate shows no substances additional to the spots for the α-anomer: $R_f=0.45$, or 0.50 and 0.56 respectively; $[\alpha]_D^{20}=+21°$ (c.=1 in chloroform); and the β-anomer: $R_f=0.13$, or 0.35 and 0.27, respectively; $[\alpha]_D^{20}=-56°$ (c.=1 in chloroform);

$$[\alpha]_D^{20}=-28°\pm1°$$

(c.=1.16 in chloroform).

EXAMPLE B

A solution of 2.1 g. of 3-O-n-propyl-5,6-di-O-(4-chlorobenzyl)-D-glucofuranose in 25 ml. of absolute ethanol containing 0.156 g. of hydrogen chloride gas is allowed to stand at room temperature for 1 hour under an atmosphere of nitrogen, then, while being cooled, adjusted to a pH value of 7–7.5 with 30% aqueous sodium hydroxide solution and filtered; the filter residue is washed with ethanol. The combined filtrates are concentrated to half the volume at 30° under reduced pressure and diluted with water. The oily precipitate is separated and distilled under a high vacuum to yield at 195°/0.01 mm. Hg the ethyl-3-O-n-propyl-5,6-di-O-(4-chlorobenzyl) - D - glucofuranoside as a faintly yellowish oil; $[\alpha]_D^{20}=-17°\pm1°$ (c.=1 in chloroform).

EXAMPLE C

A solution of 2 g. of 3-O-(4-chlorobenzyl)-5,6-di-O-benzyl-D-glucofuranose in 25 ml. of absolute isobutanol, containing 0.156 g. of hydrogen chloride gas, is kept for 1 hour at room temperature under a nitrogen atmosphere, then adjusted to a pH value of 7 to 7.5 with 30% aqueous sodium hydroxide solution while being cooled, and filtered. The residue is washed with ethanol and the combined filtrates are concentrated to half the volume at 30° under reduced pressure and then diluted with water. The oily precipitate is separated and degassed in a high vacuum to yield the isobutyl-3-O-(4-chlorobenzyl)-5,6-di-O-benzyl-D-glucofuranoside as a thick oil; $[\alpha]_D^{20}=-50°\pm1°$ (c.=1 in chloroform).

EXAMPLE 14

Tablets, each containing 0.2 g. of the active substance, are formulated as follows:

| Ingredients (for 10,000 tablets): | G. |
|---|---|
| 3,5,6-tri-O-benzyl-D-glucofuranose | 2000 |
| Magnesium trisilicate | 1000 |
| Wheat starch | 1350 |
| Polyvinyl pyrrolidone | 200 |
| Colloidal silica | 250 |
| Talcum | 150 |
| Magnesium stearate | 50 |

The 3,5,6-tri-O-benzyl-D-glucofuranose, the magnesium tri-silicate, part of wheat starch and the colloidal silica are mixed, and the sieved mixture moistened with a solution of polyvinyl pyrrolidone in methylene chloride until a slightly plastic mass has formed which is passed through a sieve and dried; the granulate is sieved once more. The remainder of the wheat starch, the talcum and the magnesium stearate are added and the granulate is compressed into tablets of 0.5 g. weight.

EXAMPLE 15

Tablets, each containing 0.2 g. of the active substance, are formulated as follows:

| Ingredients (for 5,000 tablets): | G. |
|---|---|
| 3-O-(4-chlorobenzyl)-5,6-di-O-benzyl-D-glucofuranose | 1000 |
| Magnesium trisilicate | 500 |
| Wheat starch | 675 |
| Polyvinyl pyrrolidone | 100 |
| Colloidal silica | 125 |
| Talcum | 75 |
| Magnesium stearate | 25 |

The tablets are formulated as described in Example 14.

EXAMPLE 16

Tablets, each containing 0.2 g. of active substance, are formulated as follows:

| Ingredients (for 20,000 tablets): | G. |
|---|---|
| 3-O-n-propyl-5,6-di-O-(4-chlorobenzyl)-O-glucofuranose | 4000 |
| Magnesium trisilicate | 2000 |
| Wheat starch | 2700 |
| Polyvinyl pyrrolidone | 400 |
| Colloidal silica | 500 |
| Talcum | 300 |
| Magnesium stearate | 100 |

The tablets are formulated as described in Example 14.

EXAMPLE 17

Capsules containing 0.2 g. of the active ingredient are prepared as follows:

| Ingredients (for 10,000 capsules): | G. |
|---|---|
| 1,2-di-O-acetyl-3,5,6-tri-O-benzyl-D-glucofuranose | 2000 |
| Ethanol abs. | 200 |

The 1,2-di-O-acetyl-3,5,6-tri-O-benzyl-D-glucofuranose is mixed with the ethanol and the mixture is filled into soft gelatine capsules on a suitable encapsulating machine.

We claim:

1. An antiinflammatory composition comprising an effective antiinflammatory amount of a member selected from the group consisting of a D-glucofuranose compound of the formula

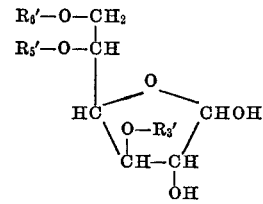

wherein one of $R_3'$, $R_5'$ and $R_6'$ is benzyl substituted in the phenyl ring by a member selected from the group consisting of halogen and lower alkyl and each of the others is a member selected from the group consisting of lower alkyl, benzyl, benzyl substituted in the phenyl ring by lower alkyl, benzyl substituted in the phenyl ring by lower alkoxy, benzyl substituted in the phenyl ring by lower alkylenedioxy, benzyl substituted in the phenyl ring by halogeno and benzyl substituted in the phenyl ring by trifluoromethyl, an acyl derivative thereof derived from a member selected from the group consisting of a lower alkanecarboxylic and a lower alkanedicarboxylic acid, and a therapeutically acceptable salt of such compound having a salt-forming group, together with a pharmaceutically acceptable carrier.

2. An antiinflammatory composition as claimed in claim 1 comprising an effective antiinflammatory amount of a member selected from the group consisting of a compound as shown in claim 1, in which $R_3'$ is lower alkyl, and each of the groups $R_5'$ and $R_6'$ is a member selected from the group consisting of benzyl, benzyl substituted in the phenyl ring by lower alkyl and benzyl substituted in the phenyl ring by halogeno, an acyl derivative thereof derived from a member selected from the group consisting of a lower alkanecarboxylic and a lower alkanedicarboxylic acid, and a therapeutically acceptable salt of such compound having a salt-forming group, together with a pharmaceutically acceptable carrier.

3. An antiinflammatory composition as claimed in claim 1 wherein each of $R_3'$, $R_5'$ and $R_6'$ is benzyl, together with a pharmaceutically acceptable carrier.

4. An antiinflammatory composition as claimed in claim 1 wherein $R_3'$ is 4-chlorobenzyl and each of $R_5'$ and $R_6'$ is benzyl, together with a pharmaceutically acceptable carrier.

5. An antiinflammatory composition as claimed in claim 1 wherein $R_3'$ is n-propyl and each of $R_5'$ and $R_6'$ is 4-chlorobenzyl, together with a pharmaceutically acceptable carrier.

References Cited

UNITED STATES PATENTS 3,157,634   11/1964   Druey et al. _____ 260—210

J. D. GOLDBERG, Primary Examiner

V. D. TURNER, Assistant Examiner

U.S. Cl. X.R.

260—209 R

PO-1050
(5/69)

UNITED STATES PATENT OFFICE
CERTIFICATE OF CORRECTION

Patent No. 3,655,884                Dated April 11, 1972

Inventor(s) ALBERTO ROSSI ET AL

It is certified that error appears in the above-identified patent and that said Letters Patent are hereby corrected as shown below:

Column 1, line 6, delete "Ciba Corporation" and substitute
--- CIBA-GEIGY Corporation ---.

Column 18, line 48, claim 1, before "benzyl", insert --- benzyl
or ---.

Signed and sealed this 9th day of April 1974.

(SEAL)
Attest:

EDWARD M. FLETCHER, JR.            C. MARSHALL DANN
Attesting Officer                  Commisioner of Patents jac